United States Patent
Boen et al.

(10) Patent No.: US 7,799,270 B2
(45) Date of Patent: Sep. 21, 2010

(54) ELECTROMAGNETIC DEVICE FOR FUSION AND INTERFACIAL AGITATION OF DIPHASE SYSTEMS, PARTICULARLY FOR THE ACCELERATION OF METALLURGIC OR PYROCHEMICAL PROCESSES

(75) Inventors: Roger Boen, Saint-Alexandre (FR); Xavier Deschanels, Le Pin (FR); Florent Lemort, Villeneuve les Avignon (FR); René Piccinato, Marseille (FR); Yves Fautrelle, Meylan (FR); Jacqueline Etay, Oleylen (FR); Damien Perrier, Grenoble (FR); Roland Ernst, Giéres (FR)

(73) Assignee: Commissariat a l'Energie Atomique, Paris (FR)

( * ) Notice: Subject to any disclaimer, the term of this patent is extended or adjusted under 35 U.S.C. 154(b) by 318 days.

(21) Appl. No.: 10/517,968

(22) PCT Filed: Jun. 11, 2003

(86) PCT No.: PCT/FR03/01742

§ 371 (c)(1),
(2), (4) Date: Dec. 13, 2004

(87) PCT Pub. No.: WO03/106009

PCT Pub. Date: Dec. 24, 2003

(65) Prior Publication Data

US 2005/0200442 A1    Sep. 15, 2005

(30) Foreign Application Priority Data

Jun. 13, 2002  (FR)  .................................. 02 07262

(51) Int. Cl.
F27D 11/06    (2006.01)
H05B 6/04     (2006.01)
H05B 6/06     (2006.01)

(52) U.S. Cl. ........................ 266/234; 266/242; 266/275; 373/146; 373/147; 373/148

(58) Field of Classification Search ................. 266/234, 266/237, 242, 275; 432/252; 373/146, 147, 373/148
See application file for complete search history.

(56) References Cited

U.S. PATENT DOCUMENTS 1,852,215 A    4/1932    Fitch
(Continued)

FOREIGN PATENT DOCUMENTS

DE    972 054    5/1959
(Continued)

OTHER PUBLICATIONS

Kotchnev, E. K.; "Experimental Industrial Installation Designed for Electromagnetic Mixing of a Liquid Cast Iron in a Ladle to Extract Sulphur".

(Continued)

Primary Examiner—Kevin P Kerns
(74) Attorney, Agent, or Firm—Nixon Peabody LLP

(57) ABSTRACT

Electromagnetic device for fusion and interfacial agitation of diphase systems, particularly for the acceleration of metallurgic or pyrochemical processes, which includes for example a crucible to contain a diphase system, an inductor surrounding this crucible, and a circuit for the supply of the inductor by a current with two components, namely a high frequency component which melts the phases of the system and a low frequency component which agitates the interface of the phases.

14 Claims, 2 Drawing Sheets

U.S. PATENT DOCUMENTS

| | | | | |
|---|---|---|---|---|
| 2,090,074 | A * | 8/1937 | Rohn | 373/146 |
| 3,602,595 | A * | 8/1971 | Dahlquist et al. | 356/36 |
| 4,749,026 | A * | 6/1988 | Metz et al. | 164/504 |
| 4,778,518 | A | 10/1988 | Bergman et al. | |
| 5,272,719 | A * | 12/1993 | Cartlidge et al. | 219/662 |
| 5,968,223 | A * | 10/1999 | Eckert | 75/10.1 |
| 6,240,120 | B1 * | 5/2001 | Bebber et al. | 373/159 |
| 6,358,297 | B1 * | 3/2002 | Zabala et al. | 75/10.16 |

FOREIGN PATENT DOCUMENTS

| | | |
|---|---|---|
| DE | 1 583 445 | 8/1970 |
| DE | 43 14 482 A1 | 11/1994 |
| EP | 0 286 934 | 10/1988 |
| EP | 0 403 138 | 6/1990 |
| EP | 0 403 138 A1 * | 12/1990 |
| WO | 87/06332 | 10/1987 |

OTHER PUBLICATIONS

International Search Report, Jul. 19, 2002; 2 pgs.

* cited by examiner

ELECTROMAGNETIC DEVICE FOR FUSION AND INTERFACIAL AGITATION OF DIPHASE SYSTEMS, PARTICULARLY FOR THE ACCELERATION OF METALLURGIC OR PYROCHEMICAL PROCESSES

CROSS-REFERENCE TO RELATED APPLICATION

This application claims priority based on International Patent Application No. PCT/FR03/01742, entitled "Electromagnetic Device for Interfacial Melting and Stirring of Diphasic Systems, In Particular for Accelerating Metallurgical of Pyrochemical Processes" by BOEN, Roger; DESCHANELS, Xavier; LEMORT, Florent; PICCIANTO, Rene; FAUTRELLE, Yves; ETAY, Jacqueline; PERRIER, Damien; and ERNST, Roland, which claims priority of French Application No. 02 07262, filed on Jun. 13, 2002, and which was not published in English.

TECHNICAL FIELD

The present invention relates to a fusion and interfacial agitation device for a diphase system.

It particularly applies to the acceleration of metallurgic processes as well as to the acceleration of pyrochemical processes.

STATE OF THE PRIOR ART

Metallurgic elaboration or refining procedures generally implement two immiscible phases between which exchanges of materials take place.

The fusion of phases can be ensured in different ways, for example by Joule effect or by induction.

Agitation of the interface of the two phases uses mechanical or pneumatic methods. This agitation is indispensable to the acceleration of the physico-chemical process so as to attain equilibrium times that are short enough for the procedures to be profitable.

FIG. 1 is a schematic and partial view of a known device making it possible to melt a diphase system and to agitate the interface of this system.

This known device comprises a cold crucible 2. Water circulation 3 means enable this crucible 2 to be cooled.

The device in FIG. 1 also comprises an inductor 4 that surrounds the crucible 2 and that is supplied by a source 6 of high frequency current to create in crucible 2 a high-frequency electromagnetic field.

In the diphase system contained in the crucible this field generates induced currents which dissipate the power by Joule effect and melt the diphase system. The latter is composed of two immiscible phases i.e. a lower phase 8 and a higher phase 10, which are separated by an interface 12.

Lines 14 of FIG. 1 symbolise the internal mixing of the lower phase 8. This mixture is generated by the induced currents.

The device in FIG. 1 also comprises mechanical means 16 enabling the interface 12 to be agitated.

One can envisage using the "monofrequency" device of FIG. 1 with the diphase system whose fusion leads to a lower phase 8 made up of a liquid metal and a higher phase 10 made up of molten salt.

It is possible to melt these phases using the cold crucible 2 (or a hot crucible) but the transfer of chemical species towards the higher phase 10 from the lower phase 8 (which is likely to contain these chemical species) can only be carried out by agitating interface 12 sufficiently.

However, media made up of phases 8 and 10 are likely to have a very high reactivity, preventing the introduction of a third phase in these media and therefore any mechanical or pneumatic agitation of them.

In fact, mechanical (or pneumatic) agitation would lead to inserting a solid (or gas) into these media.

Moreover, where the lower 8 medium is metallic, it turns out that electromagnetic agitation linked to the application of a high frequency is limited to this metallic medium and does not have a sufficient effect at the interface 12 of media 8 and 10.

PRESENTATION OF THE INVENTION

The present invention aims to remedy the preceding drawbacks. It enables:

fusion of the phases in a cold or hot crucible,
agitation of the lower phase (which can be a metallic bath),
agitation of the interface separating the phases and
agitation of the phase which has only slight conduction choosing the modulation frequency in the lower part of the range.

In the invention, these agitations are obtained without contact with the phases.

In addition, the invention enables the interface to be agitated locally to minimise the transfer barrier effect which constitutes a diffusion underlayer likely to be formed at the interface and to renew the chemical species to be transferred through the interface, between the two phases.

To be precise, the present invention relates to a device for fusion and interfacial agitation of a diphase system, the latter comprising first and second immiscible phases which are separated by an interface, this device comprising:

a crucible intended to contain the diphase system and
fusion and agitation means provided for the fusion of the first and second phases and the agitation of their interfaces, this device being characterised in that the fusion and agitation means include an inductor surrounding the crucible and
means of supplying this inductor by a variable current with at least one component, this component being capable of agitating the interface of the first and second phases.

According to a first particular embodiment of the device according to the invention, the crucible is a cold crucible and the variable current has first and second components, the first component having a first frequency and being capable of melting the first and second phases, the second component having a second frequency, which is lower than the first frequency and capable of agitating the interface of the first and second phases.

According to a preferred embodiment of this device, the means of supplying the inductor are capable of providing an alternative current with the first frequency, this alternative current being modulated by the second frequency.

The means for supplying the inductor preferably include a capacitor forming with the inductor an oscillating circuit which operates at its own resonance frequency, this resonance frequency forming the first frequency,
an induction generator provided to supply this oscillating circuit and
a function generator provided to impose modulation at the second frequency and supply a reference current to the induction generator.

The power of the induction generator is preferably in the interval from 10 kW to 300 kW.

The resonance frequency is preferably in the interval from 1 kHz to 20 kHz.

This resonance frequency preferably amounts to approximately 14 kHz.

The modulation frequency is preferably in an interval from 0.5 Hz to 10 Hz.

According to the second mode of realisation specific to the device that is the subject of this invention, the crucible is a hot crucible.

According to a second particular embodiment of the device according to the invention, the frequency of the component which is capable of agitating the interface of the first and second phases is selected low enough for the component to be also capable of agitating the second phase when the latter is little electrically conductive, this second phase being above the first phase.

The device according to the invention can also comprise means for controlling the thermal gradients inside the first and second phases.

These controlling means can comprise screens or susceptors.

The device according to the invention particularly applies to the fusion and interfacial agitation of a diphase system in which the first phase is a metal and the second phase is a slag or a salt.

BRIEF DESCRIPTION OF THE DRAWINGS

The present invention will be better understood on reading a description of examples of implementation given below, purely for guidance and in no way restrictive, referring to the appended drawings where.

DETAILED PRESENTATION OF PARTICULAR EMBODIMENTS

A device in accordance with the invention makes it possible to accelerate the chemical exchanges between two immiscible phases heated by induction. This device jointly provides the fusion of the two phases, the mixing of the lower phase which is for example a liquid metal and the agitation of the interface between the phases.

In accordance with the invention, all these functions are provided by the use of a cold crucible supplied with an alternative electrical current with two frequencies, i.e. a high frequency and a low frequency.

This makes it possible, without any contact with the reaction medium, to heat and melt the lower phase (metallic phase in the example) thanks to the high frequency component of the inductor current, the heating and the fusion of the higher phase (oxide or saline slag in the example) taking place by conduction and convection, to mix the metallic bath thanks to the same high-frequency component and to ensure agitation of the interface between the metallic phase and the slag using the current's low frequency component.

Figure 1:
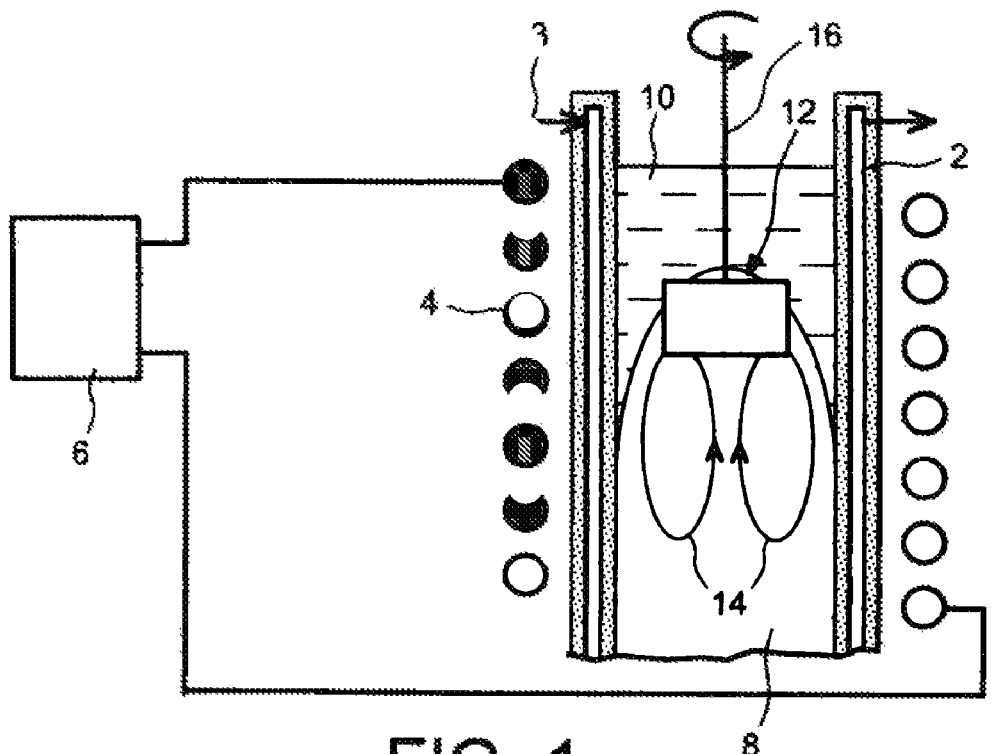
FIG. 1 is a schematic and partial view of a known "monofrequency" device with a cold crucible, mechanically agitated and which has already been described.
Figure 2:
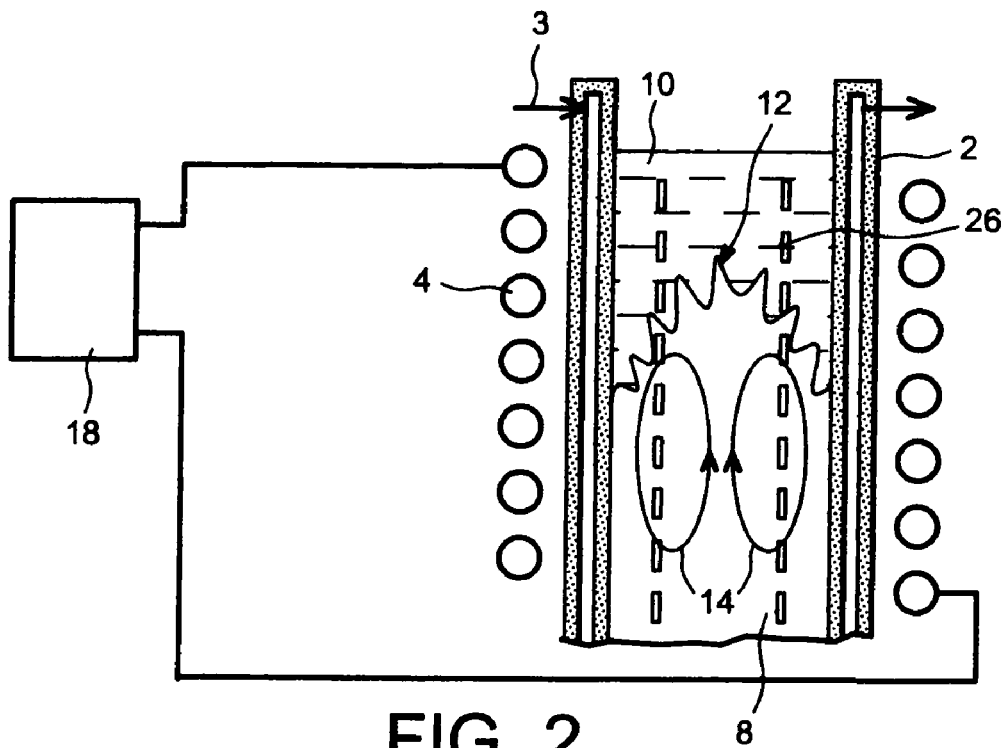
FIG. 2 is a schematic and partial view of a "bifrequency" device in accordance with the invention, with a cold crucible, agitated electromagnetically.

FIG. 2 is a schematic view of a device in accordance with the invention, enabling fusion of the diphase system by applying a double frequency. In this case, interface 12 is agitated electromagnetically and therefore without contact.

To achieve the internal mixture and the heating in an optimum manner, the high frequency is selected according to the following traditional criterion:

$$0.1 < \delta/Ri < 0.3$$

where Ri represents the inner radius of crucible 2 and $\delta$ the electromagnetic of skin depth in liquid metal 8.

The agitation of interface 12 is obtained by a judicious choice of the low frequency component of the inductor current. This is defined from the eigen frequencies of the gravito-capillary waves of the interface as follows:

$$f_b \approx (g/2\pi Ri)^{1/2}$$

where $f_b$ represents the frequency of the low frequency modulation of the inductor current and g the acceleration of gravity.

According to the specific value of this modulation frequency, the wavelength of the deformation of interface 12 can be selected according to the species to be transferred and the state of passivation of this interface 12.

The device of FIG. 2 includes means 18 for supplying the inductor 4. These means 18 enable a high frequency current to be generated which is modulated by a low frequency.

Figure 3:
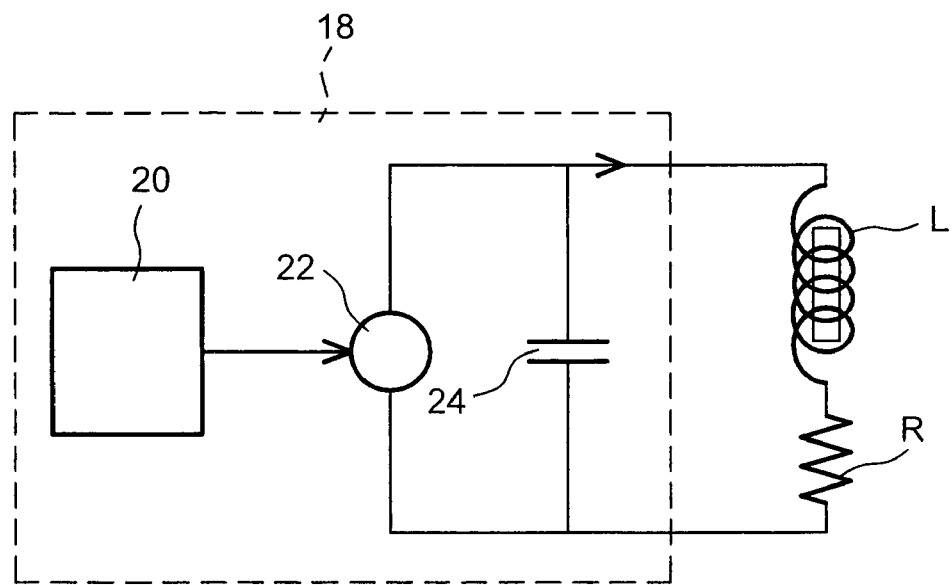
FIG. 3 is a diagram of an example of means of supplying electricity to the inductor of the device of FIG. 2.

An example of these means 18 is schematically represented in FIG. 3 and comprises a function generator 20, an induction generator 22 and a capacitor 24 formed by a battery of elementary capacitors.

The system formed by the inductor 4 and the cold crucible 2 of FIG. 2 is characterised on FIG. 3 by a resistor R and an inductance L.

The inductor is mounted in parallel with the capacitors battery 24 and forms with the latter an oscillating circuit.

The inductor generator 22 has a power of 100 kW and supplies this oscillating circuit. The latter works at its own resonance frequency which is approximately 14 kHz.

The modulation is imposed by the function generator 20.

In the example of FIG. 3 this generator 20 is the kind that is sold by the Metrix company.

The function generator 20 provides a reference current at the input of the induction generator 22. The latter is mounted in parallel with the capacitors battery 24.

The obtained inductor current has the conventional appearance of a sinusoidal carrier signal which is modulated by another sinusoidal signal, the carrier signal having the oscillating circuit's eigen frequency (high frequency) while the frequency of the other sinusoidal signal corresponds to the low frequency mentioned above.

Prior studies have been done to characterise the influence of different types of agitation on mass transfers through a metal/liquid interface.

First of all, transfer experiments have been made on a pocket of mercury placed in a solenoid coil fed by an alternative electrical current. According to the frequency of this current, it is possible to create three types of movement in the mercury:

an inner electromagnetic mixing without surface oscillation (f>20 Hz)

oscillations of the mercury-electrolyte interface without internal mixing (f<10 Hz).

an internal mixing with superimposed surface oscillations which constitute a mixed rate (10 Hz<f<20 Hz).

The experiments were made with a tank with a diameter of 178 mm and a mercury height of 124 mm.

Exchange ratios were established which were obtained according to the intensity of the speed of the fluid which is proportionate to the intensity of the inductor current and it was found that a frequency f of 14 Hz (mixed rate) gives the highest values of the exchange ratios.

It was possible, from measurements and similarity analyses, to formulate, for exchange ratio k, a semi-empirical law which is valid in case of high speeds and such that:

$$k = a(D_m/d)(\rho U^2/(\rho g \gamma)^{1/2})^{3/4} \quad [1]$$

k: exchange ratio also called mass transfer ratio (m/s)
$D_m$: ratio of diffusion of the compound in its liquid matrix
d: diameter of the pocket
U: characteristic speed of the bath
ρ: volume mass of the bath
g: acceleration of the gravity
γ: interfacial tension.

a is an empirical ratio characterising the efficiency of the agitation. The values arising from the experiments made with the mercury are as follows:

a of the order of $10^3$ for the surface agitation alone,
a of the order of $1.3 \times 10^4$ for internal agitation,
a of the order of $2.8 \times 10^4$ to $6.0 \times 10^4$ for the mixed rate.

The measurements of the mass transfer ratio at the interface according to the different types of agitation have shown that the most effective transfer was obtained in the case of the mixed rate. The transfer gain varies from a factor of 2 to 5 and can be explained by the following:

The internal mixture is indispensable to renew the chemical species near the interface but it is not enough to break the diffusion barrier.

The surface waves have the effect of creating local agitation on the interface and reducing the effect of the diffusion barrier. In addition, specific tests have shown that this type of agitation enables possible passivation layers that disturb all the transfer physical-chemical processes to be broken.

Agitation tests carried out under heat have shown the need to have an overall agitation of the bath as well as of the interface.

A transfer test was carried out at 750° C. between a metallic bath with a zinc base and a fluorated saline phase.

Without interface agitation, a large number of metallic particles are reduced but not transferred. In this case the transfer operation is not carried out and cannot be done within a reasonable time (less than 24 h).

With interfacial agitation, the reducible elements are entirely transferred towards the metallic phase. In this case the transfer operation is carried out in a few minutes.

The same observations were made with the use of Al—Cu alloys and $LiF$—$CaF_2$ salt.

It was also verified that use of an electromagnetic method prevents the inclusion of contamination elements from mechanical agitation systems.

An in-depth study of the physico-chemical phenomena that occur in these diphase environments shows the possibility of seeing appear at the interface passivation layers that induce galvanic phenomena on both sides of the interface.

Therefore elements can be reduced directly inside the salt by electronic transfer, without there being any transfer of these elements towards the metallic phase. One finds oneself then with a saline phase loaded with reduced metallic species that have not been decanted towards the metallic phase.

Performing interfacial agitation prevents the formation of these passivating layers and enables the saline phase to be totally purified. This highlights the absolute necessity of maintaining an interfacial agitation so as to totally purify one of the two phases.

The characteristic speed U of a liquid steel bath contained in a cold crucible of 60 mm in diameter has been numerically estimated, generating a static dome with a height H of 30 mm:

$$U \approx 0.4 \, (gH)^{1/2} = 0.22 \text{ m/s}.$$

For γ=1.7 N/m and ρ=7200 kg/m³, the semi-empiric relation [1] provides an assessment of the exchange ratio: $k=9.3 \times 10^{-4}$ m/s.

Thus for a bath height of 60 mm, it is possible to deduct the characteristic time of mass transfer T such that:

$$T = V/(kS) \approx 64 \, s$$

where V represents the volume of the bath and S the interface area and a is considered equal to $2.8 \times 10^{-4}$.

It is also possible to determine the optimum frequency for the mass transfer. To do this and in view of the preceding arguments interface waves must be energized whose wavelength is close to the capillary length λ such that:

$$\lambda = (\gamma/(\rho g))^{1/2}.$$

λ is equal to 5 mm for liquid steel. It is therefore possible to deduce the modulation frequency f to energize the surface movement:

$$f = (1/(2\pi)) \times (g/\lambda)^{1/2} \approx 7 \text{ Hz}.$$

It is important to emphasize that the present invention, which links a cold crucible and a high frequency modulated by a low frequency is of interest in all alloy making or refining metallurgic activities as well as in advanced pyrochemical extraction and separation procedures.

It effectively displays all the advantages linked to the use of a cold crucible without any mechanical agitation being used.

Thus all the pollution or corrosion problems linked to the use of a mechanical or pneumatic agitation are resolved.

In addition, the geometry, intensity and frequencies of the electromagnetic forces field can be chosen according to the effects sought.

In addition it is possible to add to the device according to the invention that can be seen in FIG. 2 elements such as screens or susceptors 26 (FIG. 2), placed so as to better control the thermal gradients inside the metallic bath 8 and the slag 10.

The present invention is not limited to the electromagnetic agitation of a diphase system in a cold crucible.

It also applies to the electromagnetic agitation of a diphase system in a hot crucible.

Figure 4:
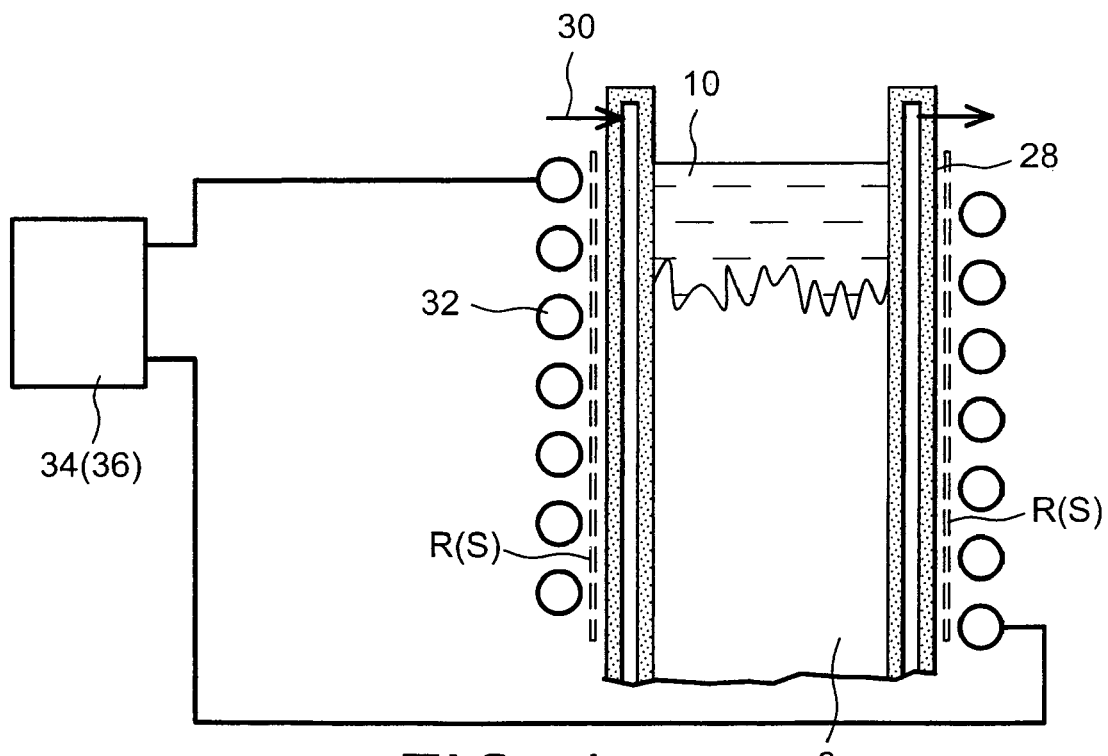
FIG. 4 is a schematic and partial view of a device in accordance with the invention, with a hot crucible agitated electromagnetically.

The later application is schematically illustrated by FIG. 4 where a hot crucible 28 can be seen with water circulation means 30 enabling this hot crucible 28 to be cooled.

This crucible is surrounded by a heating electrical resistor which is schematically shown by lines or R and supplied by a current source not shown. This resistor enables crucible 29 to be heated by Joule effect and thus to melt the diphase system (phases 8 and 10) contained in the crucible.

The device in FIG. 4 also includes an inductor 32 which surrounds crucible 28 and which is supplied by a low frequency current source 34. Thanks to this inductor 32, a low frequency electromagnetic field is created in the crucible enabling the interface to be agitated between the lower phase 8 (for example a metallic phase) and the higher phase 10 (for example a molten salt).

The frequency used is selected in the interval going from 0.5 Hz to 10 Hz.

Instead of providing the crucible 28 with the heating resistor R this crucible can be placed in a susceptor S, for example in graphite, itself placed in the inductor 32 and this inductor 34 can be fed by a dual frequency current source 36 like the means (or source) 18 described above, on one hand in view of heating the crucible 28 by induction (using the highest frequency) so that the latter then heats the diphase system it contains, and on the other hand in view of agitating the interface of the system's two phases (using the lowest frequency).

It is also specified that the upper phase 10 can be agitated, when the latter only conducts a little electricity, thanks to the low frequency provided by the source 18 or 34 or 36 if this low frequency is selected in a range from 0.5 Hz to 10 Hz.

The invention claimed is:

1. A device for fusion and interfacial agitation of a diphase system, the latter comprising first and second immiscible phases separated by an interface, this device comprising:
    a crucible configured to contain the diphase system and
    a fusion and agitation mechanism configured to fuse the first and second phases and to agitate their interface, this device being characterised in that the fusion and agitation mechanism includes:
        a power source capable of producing alternating current at a low frequency;
        an inductor surrounding the crucible; and
        an electrical circuit configured to supply the inductor with a variable current with first and second frequency components, the first frequency component having a high frequency which is higher than the low frequency, and being configured to melt the first and second phases, the second frequency component having the low frequency and being configured to agitate the interface of the first and second phases;
        wherein the current of the first and second frequency components of the variable current are both generated by the power source.

2. The device according to claim 1, in which the electrical circuit is configured to provide an alternating current with the high frequency, this alternating current being modulated by the low frequency.

3. The device according to claim 2, in which the electrical circuit further comprises:
    a capacitor forming, with the inductor, an oscillating circuit that operates at its own resonance frequency, the resonance frequency forming the high frequency;
    wherein the power source comprises:
        an induction generator configured to supply the oscillating circuit; and
        a function generator configured to impose modulation at the low frequency and to supply a reference current to the induction generator.

4. The device according to claim 3, in which the power of the induction generator is in the interval from 10 kW to 300 kW.

5. The device according to claim 3, in which the high frequency is in the interval from 1 kHz to 20 kHz.

6. The device according to claim 3, in which the low frequency is in the interval from 0.5 Hz to 10 Hz.

7. The device according to claim 1, further comprising one or more fluid conduits in contact with the crucible for removing heat from the contents of the crucible.

8. The device according to claim 7, further comprising a resistance heater for heating the contents of the crucible.

9. The device according to claim 1, in which the frequency of the frequency component which is configured to agitate the interface of the first and second phases is chosen for the frequency component to also be configured to agitate the second phase, this second phase being above the first phase.

10. The device according to claim 1, further comprising a control mechanism configured to control thermal gradients inside the first and second phases.

11. The device according to claim 10, wherein the control mechanism comprises a screen or a susceptor.

12. The device according to claim 1, wherein the first phase is a metal and the second phase is a slag or a salt.

13. A method of using a device for fusion and interfacial agitation of a diphase system, comprising the steps of:
    providing a device according to claim 1;
    providing a composition within the crucible comprising a first phase and a second phase separated by an interface;
    configuring the electrical circuit so that the first frequency component of the variable current is sufficient to melt the first and second phases, and the second frequency component of the variable current is sufficient to agitate the interface of the first and second phases.

14. The method of claim 13, wherein the device is the device according to claim 3.

* * * * *